Feb. 7, 1961

T. R. KELLBERG 2,970,713

SWITCH AND OUTLET BOX CLAMP

Filed May 13, 1959

Theodore R. Kellberg
INVENTOR.

BY *Clarence A. O'Brien*
and *Harvey B. Jacobson*
Attorneys

Feb. 7, 1961 T. R. KELLBERG 2,970,713
SWITCH AND OUTLET BOX CLAMP
Filed May 13, 1959 2 Sheets-Sheet 2
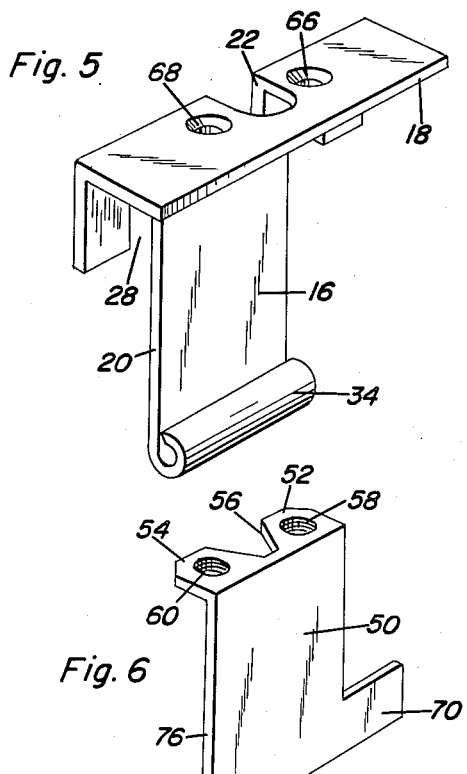
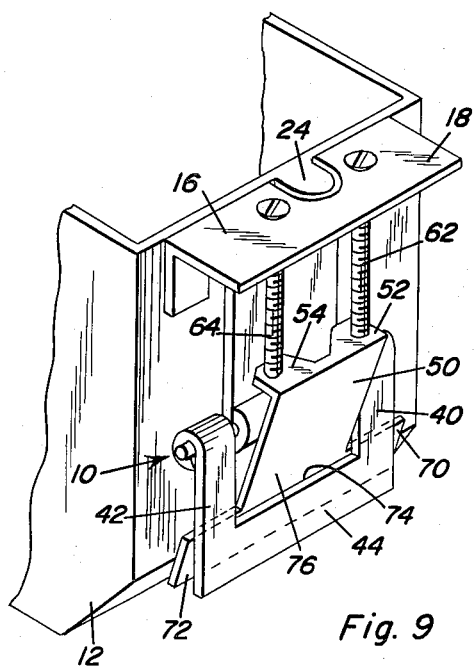
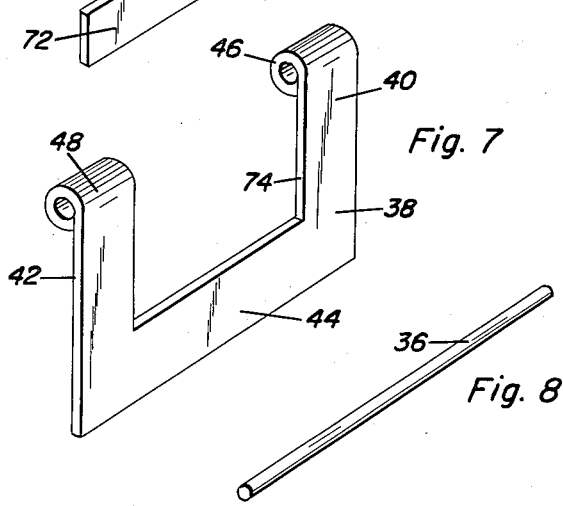
Theodore R. Kellberg
INVENTOR.
BY *Clarence A O'Brien*
*and Harvey B. Jacobson*
Attorneys United States Patent Office 2,970,713
Patented Feb. 7, 1961

2,970,713

SWITCH AND OUTLET BOX CLAMP

Theodore R. Kellberg, Garland Station, W. Garland and N. Madison St., Spokane, Wash.

Filed May 13, 1959, Ser. No. 812,985

6 Claims. (Cl. 220—3.6)

This invention relates to electrical boxes and more particularly to a mounting clamp constructed and arranged to enable a person to mount a switch or outlet box quickly and firmly in a wall of any type.

In order to mount a switch box with the conventional type of bracket the electrician has to be careful when he makes a hole in a plaster wall so that he can place the wood screws in a lath to hold the box or on a stud if one is nearby. The electrician must drill holes of the correct size and should use four wood screws of the correct size and length. Sometimes when the electrician drills the holes for the screws the plaster chips and cracks and then the electrician has to readjust the bracket to fit on the lath and fasten it with shorter screws.

Mounting a switch box with an ordinary bracket in a wall of plasterboard presents further problems. The electrician has to be certain that he makes the hole for the box by a stud so that he can fasten the box to the stud or he has to use some type of metal fastener that hooks behind the plasterboard and bends into the box. If the fasteners are not bent properly the box is loose or the ends of the metal will come in contact with bare parts of the switch or receptacle and cause a short circuit.

A mounting bracket in accordance with this invention requires no special drills, no extra screws and there is nothing placed inside of the box to interfere with the electrical wiring, switch or receptacle. Furthermore, the mounting bracket disclosed herein is easier to use than any type of mounting bracket since all of the work is done from the front face of the box.

Accordingly, a further object of the invention is to provide an improved mounting bracket which materially facilitates the installation of an electrical outlet box on any conventional thickness wall and without adding any parts or pieces in the electrical box.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is a perspective view of one part of a typical mounting bracket assembly.

Figure 6 is a perspective view of another part of the bracket assembly.

Figure 7 is a further part of the bracket assembly.

Figure 8 is a perspective view of a hinge pin also constituting a part of the bracket assembly.

Figure 9 is a fragmentary perspective view of the bracket assembly and an electrical outlet box.

Figure 1:
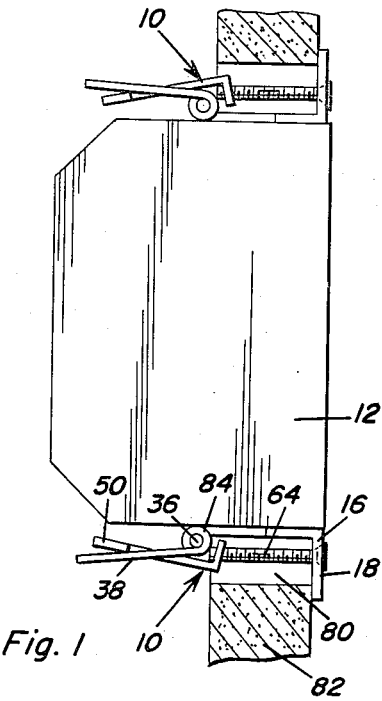
Figure 1 is a side view of an electrical box equipped with mounting brackets in accordance with the invention and showing the mounting brackets as they would appear when being inserted in an opening in a wall.
Figure 3:
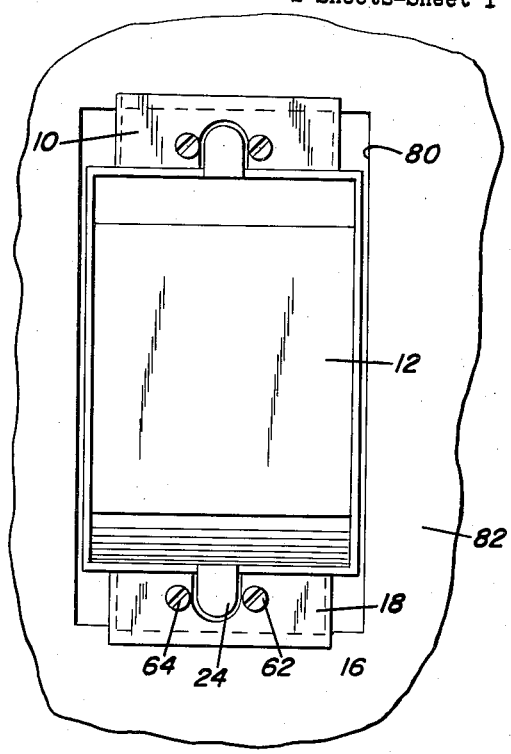
Figure 3 is a front view of the box in Figure 2.
Figure 2:
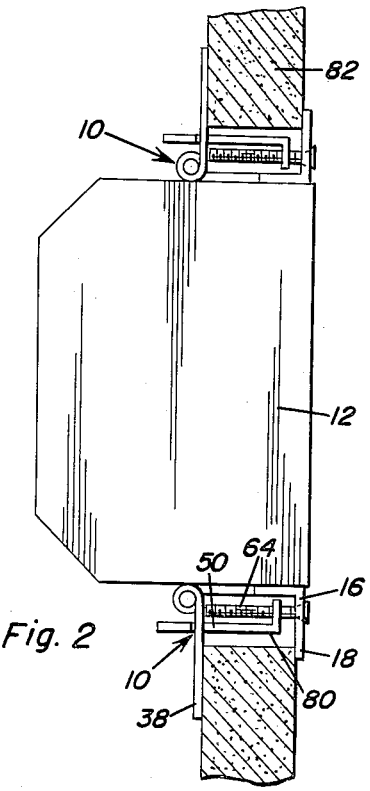
Figure 2 is a side view similar to Figure 1 but showing the mounting brackets clamped in place.

The bracket assembly 10 which illustrates the principles of the invention may be applied to any type of electrical box. Therefore only a switch and receptacle box 12 of rectangular shape is shown in the drawing, it being clearly understood that bracket assembly 10 can be applied to an octagonal box or any other shape box. Bracket assembly 10 is duplicated at each end of the box 12, and both bracket assemblies are identical in all details.

Figure 4:
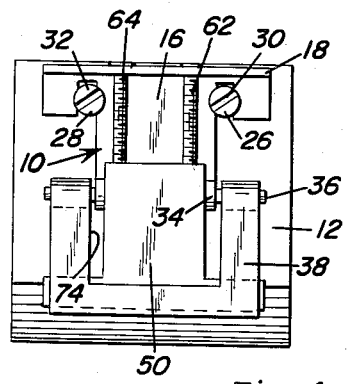
Figure 4 is a end view of the box equipped with the mounting bracket.

The bracket assembly is composed of only four parts. There is a mounting plate 16 (Figure 5) which is essentially L-shaped when viewed from the side edge. The mounting plate has a flat upper wall 18 and a flat side wall 20 joined to one edge of the flat upper wall. Notch 22 is formed at the juncture of walls 18 and 20 and opens through both of these walls. The notch 22 receives the tab 24 that projects laterally from one wall of box 12. There are a pair of slots 26 and 28 (Figure 4) adapted to receive screws 30 and 32 to mount plate 16 on one side wall of box 12. The screws are threaded into tapped openings in the wall of box 12 thereby firmly fastening plate 16 to the wall of the box. The lower edge of plate 16 has a hinge butt formed of sleeve 34. This hinge butt receives hinge pin 36 (Figure 8) and couples the locking plate or lock 38 thereto. Locking plate or lock 38 is substantially U-shaped and therefore, it has sides 40 and 42 connected by member 44. Two hinge butts are constructed of a pair of sleeves 46 and 48 at the ends of sides 40 and 42, and they are spaced apart a distance sufficient to receive sleeve 34 therebetween. Hinge pin 36 is passed through all of the sleeves that form the three hinge butts 34, 46 and 48 thereby hingedly coupling the lock 38 to the mounting plate 16.

A lock operating plate 50 which is approximately T-shaped, is operatively connected with the lock and with mounting plate 16. A pair of ears 52 and 54 extend from one edge of the operating plate or operator 50 and these have a notch 56 therebetween. There are threaded apertures 58 and 60 in the ears 52 and 54, and these receive bolts 62 and 64. The bolts are passed through countersunk holes 66 and 68 in the upper wall 18 of mounting plate 16 and are threaded into the tapped openings 58 and 60. Laterally projecting ears 70 and 72 are in a plane at right angles to ears 52 and 54 and are at the end of the operating plate 50 opposite to that end to which the ears 52 and 54 are connected. The space 74 between sides 40 and 42 of lock 38 is sufficient to receive the comparatively narrow shank portion 76 of operating plate 50, but the laterally projecting ears 70 and 72 fit beneath the sides 40 and 42 of lock 38.

In use and operation the bracket assemblies are adjusted to the position shown in Figure 1 that is, with the operating plate or operator 50 and the locking plate or lock extending generally in directions substantially parallel to one wall of box 12. Box 12 together with its mounting assemblies 10 are inserted in an aperture 80 made in wall 82 which may be of any composition and any practical thickness. Thereafter screws 62 and 64 are rotated in a direction which draws the operator 50 toward wall 18. Ears 72 and 70 contact one surface of the sides 40 and 42 of lock 38 and compel it to move in a rotational manner with the axis of rotation being established by the hinge 84 constructed of the three described hinge butts and the hinge pin 36. When one surface of lock 38 bears against the rear surface of the wall 82, the electrician stops tightening the screws 62 and 64 inasmuch as the box is firmly anchored in place in the opening 80. This is all that is required to install the box in a highly satisfactory, stable and secure manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mounting bracket assembly for an electrical box which has a wall, said assembly comprising a mounting plate, means for attaching said mounting plate to said wall, said mounting plate having a hinge butt, a lock having at least one hinge butt, a hinge pin connecting said hinge butts to constitute a hinge by which said lock is hingedly connected with said mounting plate, means operatively connected with said mounting bracket and in contact with said lock for hingedly actuating said lock, including an operator, at least one screw, said operator having a tapped opening in which said screw is received, said mounting plate also having an opening through which said screw passes, said operator having at least one ear in sliding contact with one surface of said lock so that upon rotation of said screw said operator is moved causing said operator ear to slide on the surface of said lock and hingedly move said lock.

2. The bracket assembly of claim 1 wherein said lock is U-shaped and has a pair of essentially parallel sides, said operator having a shank fitted between said sides of said lock, and said ear of said operator being in sliding contact with one of the sides of said lock plate.

3. A mounting bracket assembly for an electrical outlet box wherein the box has a side wall, said bracket assembly comprising a mounting plate secured to said side wall, said mounting plate having a pair of walls connected together at approximately right angles, a first of said walls protruding laterally from said box wall and the other of said mounting plate walls fitting flush against said box wall, said first mounting plate wall having a pair of apertures, an operating plate having a pair of tapped openings, a pair of threaded fasteners passed through said apertures and openings, said operating plate having a pair of laterally projecting ears, an essentially U-shaped locking plate, means hingedly securing the ends of the sides of said U-shaped locking plate to said side of said mounting plate which fits flush against the box wall, and said laterally projecting ears slidingly contacting said sides of said lock plate to impart hinged movement thereto in response to rotation of said screws.

4. A mounting bracket assembly for an electrical outlet box wherein the box has a side wall, said bracket assembly comprising a mounting plate secured to said side wall, said mounting plate having a pair of walls connected together at approximately right angles, a first of said walls protruding laterally from said box wall and the other of said mounting plate walls fitting flush against said box wall, said first mounting plate wall having a pair of apertures, an operating plate having a pair of tapped openings, a pair of threaded fasteners passed through said apertures and openings, said operating plate having a pair of laterally projecting ears, an essentially U-shaped locking plate, means hingedly securing the ends of the sides of said U-shaped locking plate to said side of said mounting plate which fits flush against the box wall, said laterally projecting ears slidingly contacting said sides of said locking plate to impart hinged movement thereto in response to operation of said screws, and means securing said mounting plate to said box wall.

5. A clamp for mounting an electrical box in an opening in a wall, said clamp comprising in combination an angle bracket having a first arm adapted to be secured to an electrical box and a second arm adapted to abut the outer surface of a wall at the edge of an opening wherein the box is to be installed, a hinge pintle provided on said first arm of said bracket in spaced relation from the second arm, a U-shaped clamping plate wider than and straddling the first arm of said bracket, a pair of hinge pintles provided at the ends of said clamping plate and disposed coaxially at the ends of the first mentioned hinge pintle, a hinge pin extending through the first and second mentioned pintles and connecting said clamping plate to said bracket whereby the clamping plate may be swung from an initial position substantially parallel to the first arm of the bracket outwardly to a clamping position substantially parallel to the second arm of the bracket for clamping engagement with the inner surface of the stated wall, and means for swinging said clamping plate to its clamping position, said means comprising an operating plate extending slidably through said U-shaped clamping plate, a pair of laterally projecting ears provided at opposite sides of said operating plate and slidably engaging opposite side portions of the clamping plate, and screw means provided in the second arm of said bracket and operatively connected to said operating plate whereby the latter may cause said clamping plate to swing to its clamping position upon tightening of said screw means.

6. The device as defined in claim 5 wherein said screw means comprise a pair of transversely spaced screws extending through apertures in said second arm of said bracket, and a pair of screw-threaded ears provided on said operating plate, said screws threadedly engaging said screw-threaded ears.

References Cited in the file of this patent
UNITED STATES PATENTS
1,818,317   Gilmore _____ Aug. 11, 1931